United States Patent
Chung et al.

(10) Patent No.: US 7,197,304 B2
(45) Date of Patent: Mar. 27, 2007

(54) WIRELESS DATA COMMUNICATION PROTOCOL DIAGNOSIS SYSTEM

(75) Inventors: Jong-tae Chung, Seongnam-si (KR); Jin-soup Joung, Daejeon-si (KR); Tae-hoon Lee, Gwacheon-si (KR)

(73) Assignee: Innowireless, Co., Ltd., Seoul (KR)

( * ) Notice: Subject to any disclaimer, the term of this patent is extended or adjusted under 35 U.S.C. 154(b) by 554 days.

(21) Appl. No.: 10/422,303

(22) Filed: Apr. 24, 2003

(65) Prior Publication Data

US 2004/0029578 A1 Feb. 12, 2004

(30) Foreign Application Priority Data

Apr. 24, 2002 (KR) ............... 10-2002-0022401

(51) Int. Cl.
*H04Q 7/20* (2006.01)
(52) U.S. Cl. ............... 455/424; 455/423; 455/67.11; 702/83; 702/85
(58) Field of Classification Search ............... 702/79, 702/182, 183, 184, 185; 455/414.1, 414.2, 455/456.6, 456.1, 502, 503, 67.11, 12.1, 67.14, 455/67.7, 115.2, 226.1, 226.4, 423, 424, 115.1
See application file for complete search history.

(56) References Cited

U.S. PATENT DOCUMENTS

2005/0135287 A1* 6/2005 Gould et al. ............... 370/310

* cited by examiner

*Primary Examiner*—William Trost
*Assistant Examiner*—James D Ewart
(74) *Attorney, Agent, or Firm*—Scully, Scott, Murphy & Presser, P.C.

(57) ABSTRACT

The present invention relates to a diagnosis system for a wireless data communication protocol, and more particularly, to a wireless data communication protocol diagnosis system enabling to compare/analyze simultaneously a trouble caused by the measurement of a wireless data communication protocol by means of synchronizing individual data communication packets with mobile communication protocol measurement data by receiving the data communication packets transmitted individually from a plurality of terminals to connect to a measuring unit and by providing the individual data communication packets with precise time information from a time information providing means.

12 Claims, 6 Drawing Sheets

PRIOR ART

PRIOR ART

PRIOR ART

US 7,197,304 B2

WIRELESS DATA COMMUNICATION PROTOCOL DIAGNOSIS SYSTEM

This application claims the benefit of the Korean Application No. 10-2002-0022401 filed on Apr. 24, 2002, which is hereby incorporated by reference.

BACKGROUND OF THE INVENTION

1. Field of the Invention

The present invention relates to a diagnosis system for a wireless data communication protocol, and more particularly, to a wireless data communication protocol diagnosis system enabling to compare/analyze simultaneously a trouble caused by the measurement of a wireless data communication protocol by means of synchronizing individual data communication packets with mobile communication protocol measurement data by receiving the data communication packets transmitted individually from a plurality of terminals to connect to a measuring unit and by providing the individual data communication packets with precise time information from a time information providing means.

2. Discussion of the Related Art

FIG. 1 illustrates a block diagram of a wireless data communication protocol diagnosis system according to a related art, FIG. 2 illustrates a structural diagram of a connection phase of a protocol for a wireless data call connection according to one embodiment of a related art, and FIG. 3 illustrates a structural diagram of a connection phase of a protocol for a wireless data call connection according to another embodiment of a related art.

Referring to FIGS. 1 to 3, a wireless data communication protocol diagnosis system according to a related art mainly includes a mobile communication terminal 20, a mobile communication network 30, a data communication network matching equipment 50, a data communication network 60, a GPS receiver 80, a measurement data separating equipment 90, and a wireless data communication protocol measuring equipment 100.

The wireless data communication protocol measuring equipment 100 includes a data communication protocol packet acquisition unit acquiring data communication protocol packets by communicating with the mobile communication terminal 20.

And, the wireless data communication protocol equipment 100 includes a data communication network side data communication protocol measuring unit receiving to measure data, which are transmitted from the data communication network matching equipment 50, generated from the data communication network 60 or a data communication protocol through a communication port.

Moreover, the wireless data communication protocol measuring equipment 100 includes a mobile communication protocol measuring unit measuring data enabling to diagnose a performance or an error of the mobile communication network or mobile communication protocol by communicating with the mobile communication terminal by wire RS232C, wire USB, or wireless IrDA.

And, the mobile communication network side data communication protocol measuring unit communicates with the mobile communication terminal by wire RS232C, wire USB, or wireless IrDA to acquire data communication protocol packets (AT command, LCP, PAP, CHAP, TPCP, IP, TCP, UDP, ICMP, HTTP, HDTP), thereby measuring data enabling to diagnose a performance or error of a mobile communication network side data communication protocol.

The data communication network side data communication protocol measuring unit acquires data communication protocol packets (AT command, LCP, PAP, CHAP, IPCP, IP, TCP, UDP, ICMP, HTTP, HDTP) transmitted from the data communication network matching equipment by Ethernet to measure data enabling to diagnose a performance or error of the data communication network or the data communication protocol.

The measurement data separating equipment 90 separating the data received/transmitted between the wireless data communication protocol measuring equipment 100 and the mobile communication terminal 20 by wire RS232C, wire USB, or wireless IrDA into the data having measured the performance or error of the mobile communication protocol and the data communication protocol packets (AT command, LCP, PAP, CHAP, IPCP, IP, TCP, UDP, ICMP, HTTP, HDTP, etc.).

The wireless data communication protocol measuring equipment 100 includes a wireless data measuring equipment 110, a data communication protocol packet acquiring equipment 120, and a communication port 130. The data communication protocol packet acquiring equipment 120 communicates with the measurement data separating equipment 90 to partition the data communication protocol packet transmitted/received for data communication into 'n', thereby acquiring a packet for measurement without affecting a wireless data communication service.

The wireless data measuring equipment 110 includes a mobile communication protocol measuring unit 115 communicating with a mobile communication terminal communication port 21 of the mobile communication terminal 20 by wire RS232C, wire USB or wireless IrDA to measure data enabling to measure or diagnose the performance, error and the like of the mobile communication network 30 or the mobile communication protocol, a mobile communication network side data communication protocol measuring unit 116 measuring data enabling to measure or diagnose the performance or error of the data communication network 60 or the data communication protocol at a position of the mobile communication terminal 20 by communicating with the mobile communication terminal communication port 21 by wire RS232C, wire USB or wireless IrDA to acquire the data communication protocol packets (AT command, LCP, PAP, CHAP, IPCP, IP, TCP, UDP, ICMP, HTTP, HDTP, etc.), a data communication network side data communication protocol measuring unit 117 measuring the performance, error and the like of the data communication network 60 or the data communication protocol by communicating through the wire system such as Ethernet and the like at a presumptive position that degrades a quality or induces a trouble such as the mobile communication network 30, the data communication network matching equipment 50, a transmission section 51 between the mobile communication network 30 and data communication network matching equipment 50, and another transmission section 61 between the data communication network matching equipment 50 and data communication network 60 to acquire the data communication protocol packets (AT command, LCP, PAP, CHAP, IPCP, IP, TCP, UDP, ICMP, HTTP, HDTP, etc.), a data communication protocol packet acquiring unit 118 communicating with the communication port 21 of the mobile communication terminal 20 by wire RS232C, wire USB, or wireless IrDA using software without hardware to acquire the data communication protocol packets (AT command, LCP, PAP, CHAP, IPCP, IP, TCP, UDP, ICMP, HTTP, HDTP, etc.) without affecting a wireless data call on service (calling), and a time information synchronizing unit 113 acquiring stable time information continuously from the GPS receiver 80, a clock 22 of the mobile communication terminal 20, and another clock 112 of the wireless data measuring equipment 110 and maintaining the time information stably to arrange a generation sequence of data, which are measured by synchronizing the data measured in the mobile communication protocol measuring unit 115, mobile communication network side data communication protocol measuring unit 116, and data communication network side data communication protocol measuring unit 117 with the same time information, on a time axis.

For the purpose of the optimization of the mobile communication network 30 centering around wireless data communication or the performance measurement and trouble diagnosis of the mobile communication protocol, the wireless data communication protocol measuring unit 100 can be mounted on a vehicle for mobile use on the spot of the mobile communication network. Besides, for the purpose of optimization of the data communication network 60 centering around the wireless data communication or the performance measurement and trouble diagnosis of the data communication protocol, the wireless data communication protocol measuring unit 100 can be used on the spot of the data communication network without movement.

An embodiment of a connection phase of a protocol for a wireless data call connection, as shown in FIG. 2, is the case that uses the protocol of the mobile communication terminal 20 and the external equipments (Measuring equipment, Computer, PDA, etc.). And, the protocol is processed in a manner of the sequence including the connection steps by a connection protocol (AT command, etc.) between a data communication protocol simulator 119 and the mobile communication terminal 20, a connection protocol (IS95, CDMA2000, etc.) between the mobile communication terminal 20 and the mobile communication network 30, a connection protocol (Frame Relay, GRE, etc.) between the mobile communication network 30 and the data communication network matching equipment (IWF, PDSN, etc.) 50, a connection protocol (LCP, PAP, CHAP, IPCP, etc.) between the data communication protocol simulator 119 and the data communication network matching equipment 50, and a connection protocol (IP, TCP, UDP, HTTP, HDTP, etc.) between the data communication protocol simulator 119 and the data communication network 60.

Looking into the operation of the wireless data communication protocol measuring equipment 100, on processing the protocol for the wireless data call connection, the mobile communication network side data communication protocol measuring unit 116 measures the connection protocol (AT command, etc.) between the data communication protocol simulator 119 and the mobile communication terminal 20 from the data communication protocol packet acquiring unit 118 or the data communication protocol packet acquiring equipment 120.

The mobile communication protocol measuring unit 115 measures the connection protocol (IS95, CDMA2000, etc.) between the mobile communication terminal 20 and the mobile communication network 30 from the mobile communication terminal 20.

The mobile communication network side data communication protocol measuring unit 116 measures the connection protocol (LCP, PAP, CHAP, IPCP, IP, TCP, UDP, HTTP, HDTP, etc.) between the data communication protocol simulator 119 and the data communication network matching equipment 50 or data communication network 60 from the data communication protocol packet acquiring unit 118 or data communication protocol packet acquiring equipment 120.

The data communication network side data communication protocol measuring unit 117 measures the connection protocol (Frame Relay, GRE, etc.) between the mobile communication network 30 and the data communication network matching equipment 50, the connection protocol (LCP, PAP, CHAP, IPCP, etc.) between the data communication protocol simulator 119 and the data communication network matching equipment 50, and the connection protocol (IP, TCP, UDP, HTTP, HDTP, etc.) between the data communication protocol simulator 119 and the data communication network 60 from the presumptive equipment or position that degrades the quality or induces a trouble such as the mobile communication network 30, the data communication network matching equipment 50, the data communication network 60, the transmission section 51 between the mobile communication network 30 and data communication network matching equipment 50, and another transmission section between the data communication network matching equipment 50 and data communication network 60.

In this case, when the data communication network 60 or the data communication protocol is measured in the mobile communication network side data communication protocol measuring unit 116 or the data communication network side data communication protocol measuring unit 117, the packets transmitted/received in connection with the data communication protocols such as LCP, PAP, CHAP, IPCP, IP, TCP, UDP, ICMP, HTTP, HDTP, and the like are measured in one direction of the mobile communication network side or the data communication network side. Thus, the quality measurement and trouble diagnosis for the wireless data communication network or the wireless data communication protocol are available, but the detailed source analysis and trouble diagnosis are difficult.

Therefore, if the data communication protocol is simultaneously measured in the mobile communication side data communication protocol measuring unit 116 and the data communication network side data communication protocol measuring unit 117, the packets transmitted/received in connection with the data communication protocols such as LCP, PAP, CHAP, IPCP, IP, TCP, UDP, ICMP, HTTP, HDTP, and the like can be compared and analyzed in both directions with the data measured in the mobile communication network side and the data communication network side. Hence, the quality measurement and trouble diagnosis for the wireless data communication network or the wireless data communication protocol are available as well as the detailed source analysis and trouble diagnosis.

Moreover, transmitted/received only are the packets of the mobile communication terminal and the wireless data communication protocol measuring equipment used for measurement among the messages or packets related to the data communication network or data communication protocol of the mobile communication network side. Yet, only the packets of the mobile communication terminal and the wireless data communication protocol measuring equipment 100 used for the measurement can be filtered to reduce the amount of the measured data since there exist packets of many wireless data users in addition to the packets of the mobile communication terminal and the wireless data communication among the messages or packets related to the data communication network or data communication protocol of the data communication network side.

In order to measure the messages or packets related to the data communication network or data communication protocol of the data communication network side only, comparison and analysis are carried out on the measured data measured in the mobile communication network side data communication protocol measuring unit 116 by taking the time from a time point of trying a connection of a wireless data call to a time point of releasing the wireless data call in the wireless data communication protocol measuring equipment 100 as a measurement time in the data communication network side data communication protocol measuring unit 117. Thus, the quality measurement and trouble diagnosis for the wireless data communication network or the wireless data communication protocol are available as well as the detailed source analysis and trouble diagnosis.

Moreover, in order to reduce the amount of the measurement data, a filtering method can be used on packet measurement using identifiers such as a mobile communication terminal number, user ID, and the like which can identify the packets of the mobile communication terminal and the wireless data communication protocol measuring equipment used for measuring the packets related to the data communication network 60 or the data communication protocol in the data communication network side data communication protocol measuring unit 117.

Another embodiment of a connection phase of a protocol for a wireless data call connection, as shown in FIG. 3, is the case that uses the protocol of the mobile communication terminal 20. And, the protocol is processed in a manner of the sequence including the connection steps by a connection protocol (IS95, CDMA2000, etc.) between the mobile communication terminal 20 and the mobile communication network 30, a connection protocol (Frame Relay, GRE, etc.) between the mobile communication network 30 and the data communication network matching equipment 50, a connection protocol (LCP, PAP, CHAP, IPCP, etc.) between mobile communication terminal 20 and the data communication network matching equipment 50, and a connection protocol (IP, TCP, UDP, HTTP, HDTP, etc.) between the mobile communication terminal 20 and the data communication network 60.

Looking into the operation of the wireless data communication protocol measuring equipment 100, the mobile communication protocol measuring unit 115 measures the connection protocol (IS95, CDMA2000, etc.) between the mobile communication terminal 20 and the mobile communication network 30 from the mobile communication terminal 20. The data communication network side data communication protocol measuring unit 117 measures the connection protocol (Frame Relay, GRE, etc.) between the mobile communication network 30 and the data communication network matching equipment 50, the connection protocol (LCP, PAP, CHAP, IPCP, etc.) between the mobile communication terminal 20 and the data communication network matching equipment 50, or the connection protocol (IP, TCP, UDP, HTTP, HDTP, etc.) between the mobile communication terminal 20 and the data communication network 60 from the presumptive equipment or position that degrades the quality or induces a trouble such as the mobile communication network 30, the data communication network matching equipment 50, the data communication network 60, the transmission section 51 between the mobile communication network 30 and data communication network matching equipment 50, and another transmission section between the data communication network matching equipment 50 and data communication network 60.

In order to measure the messages or packets related to the data communication network or data communication protocol of the data communication network side only.

By taking the time from a time point of trying a connection of a wireless data call to a time point of releasing the wireless data call in the mobile communication terminal 20 as a measurement time in the data communication network side data communication protocol measuring unit 117, the quality measurement and trouble diagnosis for the wireless data communication network or the wireless data communication protocol are available as well as the detailed source analysis and trouble diagnosis.

Moreover, a filtering method can be used on packet measurement using identifiers such as a mobile communication terminal number, user ID, and the like which can identify the packets of the mobile communication terminal and the wireless data communication protocol measuring equipment used for measuring the packets related to the data communication network 60 or the data communication protocol in the data communication network side data communication protocol measuring unit 117.

And, a time sort method of the measurement data is characterized in that the data of the performance measurement and trouble diagnosis of the collected mobile communication network wireless section and the generation order of the packets in the packet section of the data communication network are effectively arranged on the same time axis.

Besides, since the measurement data of the wireless data communication protocol are generated with a time unit of $10^{-3}$ or $10^{-9}$ second, extremely stable time information is required for time-sorting the measurement data on the same time axis to set by the generation order.

Using the means for providing the time information such as the GPS receiver 80, the clock 22 inside the mobile communication terminal 20, and the clock 112 inside the wireless data communication protocol measuring equipment 100, the stable time information is acquired to maintain and the generation sequence of the wireless data protocol measurement data is effectively arranged on the same time axis.

Accordingly, whenever there is a request of the wireless data communication protocol measuring equipment 100, the GPS receiver 80 extracts the precise time information from the radio wave signal received from the GPS satellite 70 to provide. Yet, the GPS receiver fails to provide radio wave shadow areas such as an inside of a building and the like with the precise time information and needs a small synchronization acquisition time for normal operation after the supply of power.

The clock 112 of the wireless data communication protocol measuring equipment 100 enables to provide the time information by the operation of 'S/W', but the precision of the time information of the clock 112 is much inferior to that information of the GPS.

Moreover, the clock 22 inside the mobile communication terminal 20 is compensated with very precise time information provided by the mobile communication network 30, thereby enabling to provide relatively precise time information. Since the mobile communication network 30 acquires the time information from the GPS satellite 70, the time information provided by the GPS receiver 80 connected to the wireless data communication protocol measuring equipment 100 coincides with the time information provided by the mobile communication terminal 20 to a considerable extent of precision.

The time sorting method according to the related art provides the scheme of achieving time synchronization in common effectively in accordance with the statuses of the means that provide the three different kinds of the time information, respectively.

As the data, which are provided to the communication port 21 of the mobile communication terminal 20, for the performance measurement and trouble diagnosis of the mobile communication network wireless sections are provided together with time stamps, the time synchronization method finally provides the packet generated from the acquired data communication network packet section with the generation time.

The lock 112 existing inside the wireless data communication protocol measuring equipment 100 is set up in constant proportion to a minimum coefficient unit, is reduced by '1' every clock period, and stops being reduced when reaching '0'. And, the time point that the reduction stops is expressed as 'expired'.

FIG. 4 illustrates a flowchart of a time information synchronization procedure of a wireless data communication protocol measuring equipment according to a related art.

Referring to FIG. 4, after an initial set of the clock 112 (S100), it is checked whether a valid GPS time information exists or not (S200). If a valid GPS information exists, the GPS time information is extracted (S300). If there exists no valid GPS information, the time information from the mobile communication terminal 20 is extracted (S400). And, the time of the wireless data communication protocol measuring equipment 100 is compensated using the extracted time information (S500).

After the time of the wireless data communication protocol measuring equipment 100 has been compensated, the above-explained time information synchronization procedure is executed every period which is the time interval expressed by an initial value of the clock 112 (S600).

The wireless data communication protocol measuring equipment 100 is provided with the time information, which is periodically compensated using the information of the GPS receiver 80 or the clock 22 of the mobile communication terminal 20, through the above-explained processing.

Using the time information acquired by the precise time information acquisition method, the wireless data communication protocol measuring equipment 100 simultaneously measures the measurement data generated from the mobile communication protocol measuring unit 115, the mobile communication network side data communication protocol measuring unit 116, and the data communication network side data communication protocol measuring unit 117 using the time information having the same synchronization and arranges the generation sequence of the respectively measured data on the same time axis. Thus, the wireless data communication protocol measuring equipment 100 simultaneously measures and diagnose the qualities and troubles of the mobile and data communication networks 30 and 60 through which the wireless data call passes or the mobile and data communication protocols.

Even if the mobile communication protocol measuring unit 115, the mobile communication network side data communication protocol measuring unit 116, and the data communication network side data communication protocol measuring unit 117, which construct the wireless data communication protocol 100, are constituted with independent measuring equipments respectively and respectively operate as the mobile communication protocol measuring equipment, the mobile communication network side data communication protocol measuring equipment, and the data communication network side data communication protocol measuring equipment using the time information acquired by the precise time information acquisition method of the present invention, the measurement data generated respectively from the measuring equipments are simultaneously measured using the time information of the same synchronization and the generation sequence of the respectively measured data is arranged on the same time axis. The qualities of the mobile and data communication networks 30 and 60 through which the wireless data call passes or those of the mobile and data communication protocols can be simultaneously measured and the troubles thereof can be diagnosed.

Unfortunately, the related art has the following problems or disadvantages.

First of all, when the troubles caused by the wireless data communication protocol are measured to compare from a plurality of terminals, in case that one wireless data communication protocol measuring equipment, to which a plurality of the terminals are simultaneously connected, acquires a plurality of the data communication packets transmitted from a plurality of the terminals and simultaneously controls multiple data calling relating elements, a capacity of the wireless data communication protocol measuring equipment is too insufficient to grasp the quality characteristics according to the wireless data communication protocol measurements of a plurality of the terminals.

Moreover, in order to solve the problem due to the insufficient capacity of the wireless data communication protocol measuring equipment, when the system is constituted to carry out the measurements of the wireless data communication protocol individually by corresponding the wireless data communication protocol measuring equipment to a plurality of the terminals, the cost thereof is too expensive.

SUMMARY OF THE INVENTION

Accordingly, the present invention is directed to a multiple wireless data communication protocol diagnosis system that substantially obviates one or more problems due to limitations and disadvantages of the related art.

An object of the present invention is to provide a wireless data communication protocol diagnosis system enabling to compare/analyze simultaneously a trouble caused by the measurement of a wireless data communication protocol by means of synchronizing individual data communication packets with mobile communication protocol measurement data by receiving the data communication packets transmitted individually from a plurality of terminals to connect to a measuring unit and by providing the individual data communication packets with precise time information from a time information providing means.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a wireless data communication protocol diagnosis system including a plurality of mobile communication terminals connected by wire to a plurality of mobile communication networks and at least one data communication network matching equipment matching a data communication network to the corresponding mobile communication network, the wireless data communication protocol diagnosis system according to the present invention includes a plurality of data calling module units connected to a plurality of the mobile communication terminals to acquire data communication protocols of a mobile communication network side, respectively, a host computer comparing to analyze a performance of a mobile communication network side data communication protocol by receiving the data communication protocol packets from the data calling module units, the host computer comparing to analyze a performance of a data communication network side data communication protocol from the data communication network matching equipment, the host computer comparing to analyze a performance of a mobile communication protocol from each of the mobile communication terminals, and a time information providing means for providing the data calling module units or the host computer with a time information.

Preferably, if the time information providing means provides a specific one of a plurality of the data calling module units with the time information, the specific data calling module unit transfers the time information to the host computer and a plurality of the data calling module units except the specific data calling module unit are provided with the time information by the host computer.

Preferably, if the time information providing means provides a specific one of a plurality of the data calling module units with the time information, the specific data calling module unit provides the host computer or the rest of the data calling module units with the time information.

Preferably, a plurality of the data calling module units are simultaneously with the time information from a GPS receiver.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
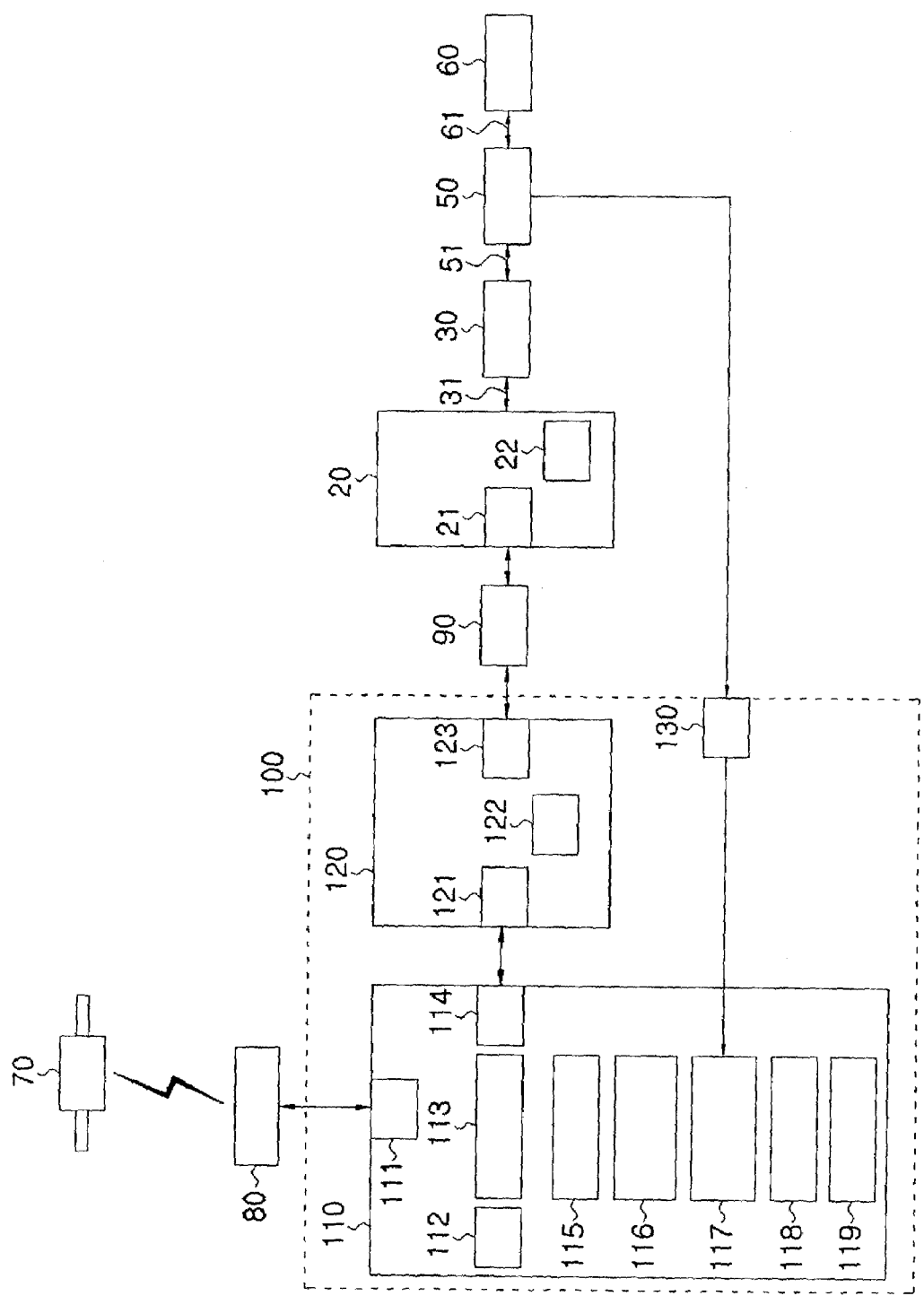
FIG. 1 illustrates a block diagram of a wireless data communication protocol diagnosis system according to a related art.
Figure 2:
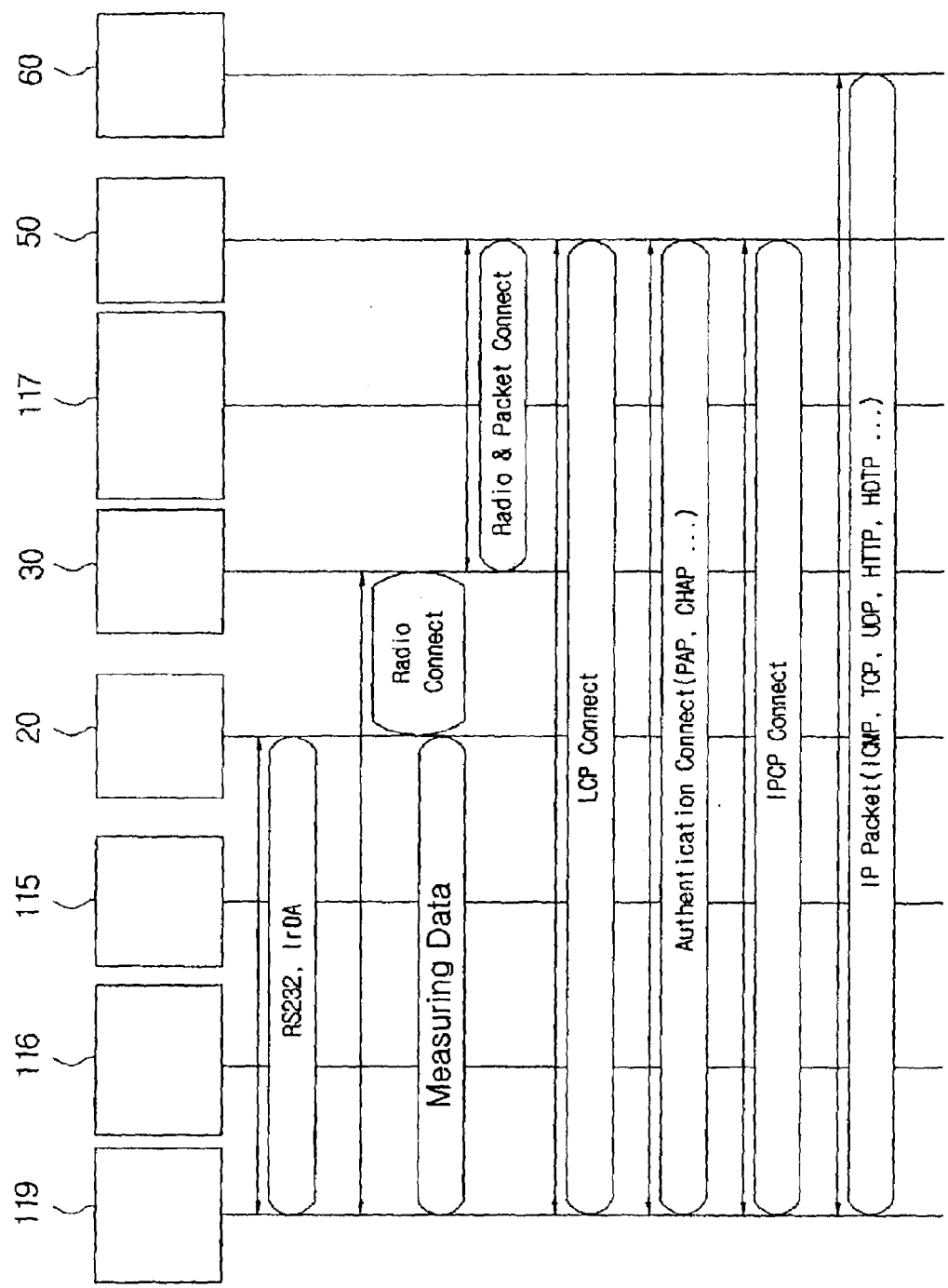
FIG. 2 illustrates a structural diagram of a connection phase of a protocol for a wireless data call connection according to one embodiment of a related art.
Figure 3:
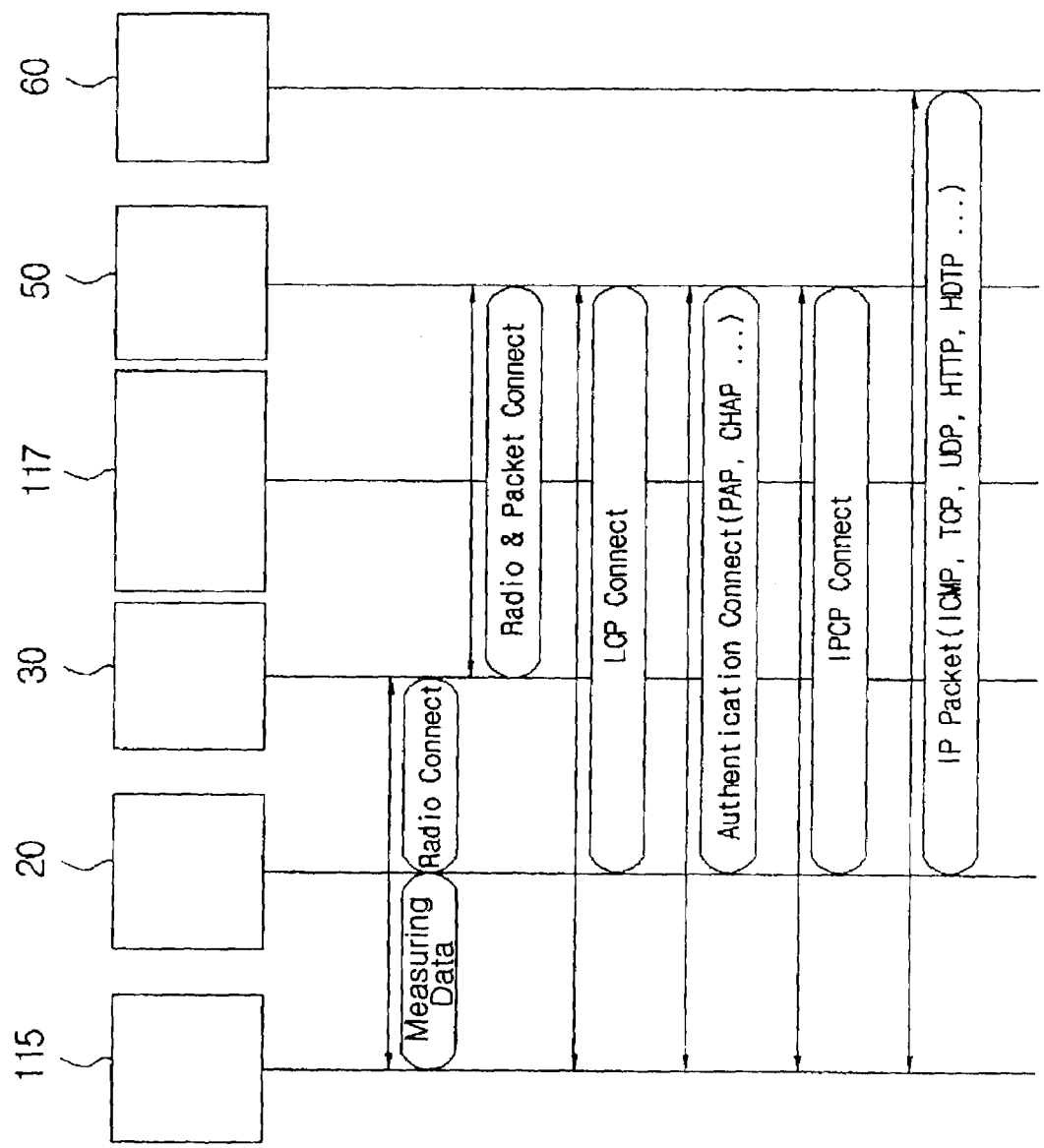
FIG. 3 illustrates a structural diagram of a connection phase of a protocol for a wireless data call connection according to another embodiment of a related art.
Figure 4:
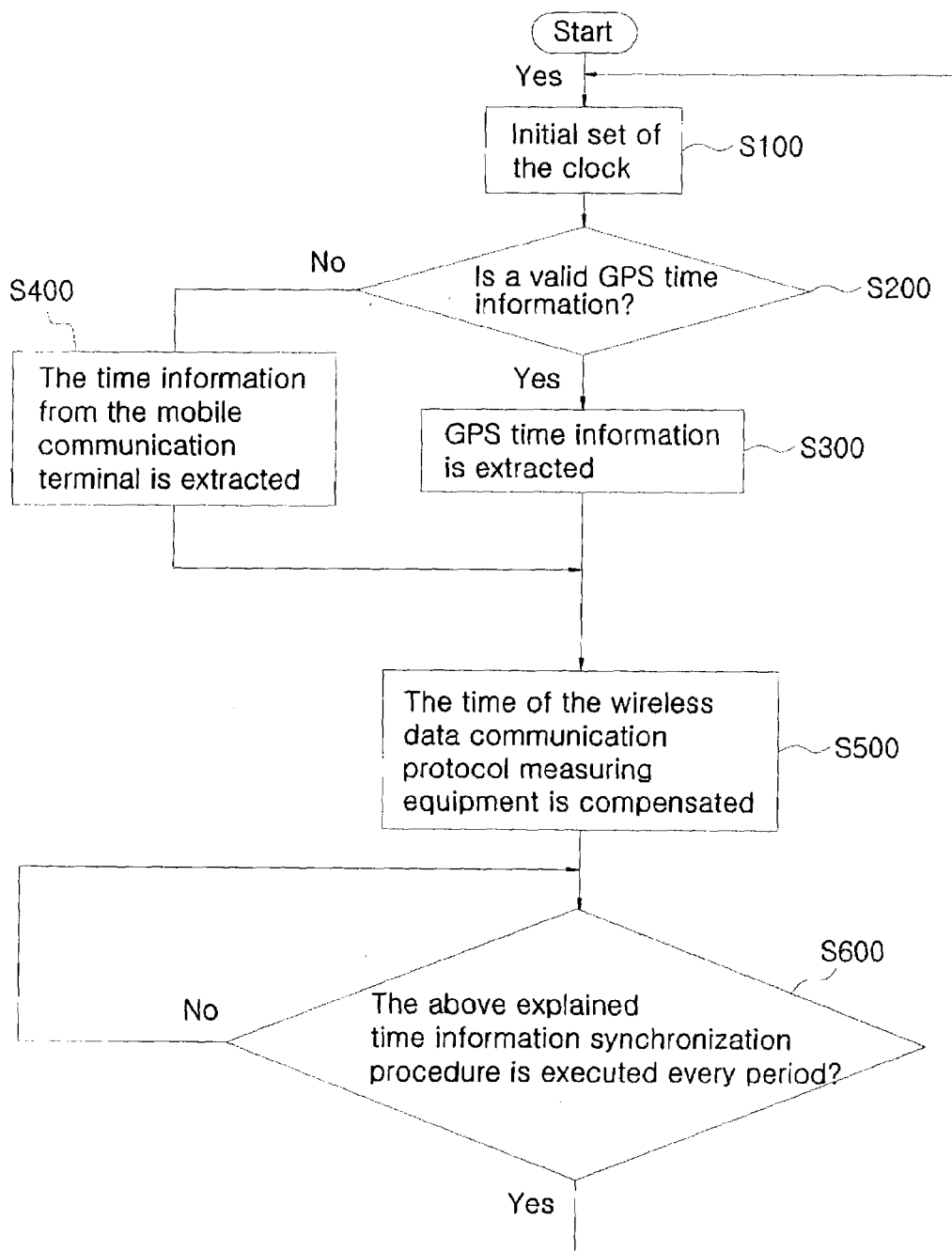
FIG. 4 illustrates a flowchart of a time information synchronization procedure of a wireless data communication protocol measuring equipment according to a related art.
Figure 5:
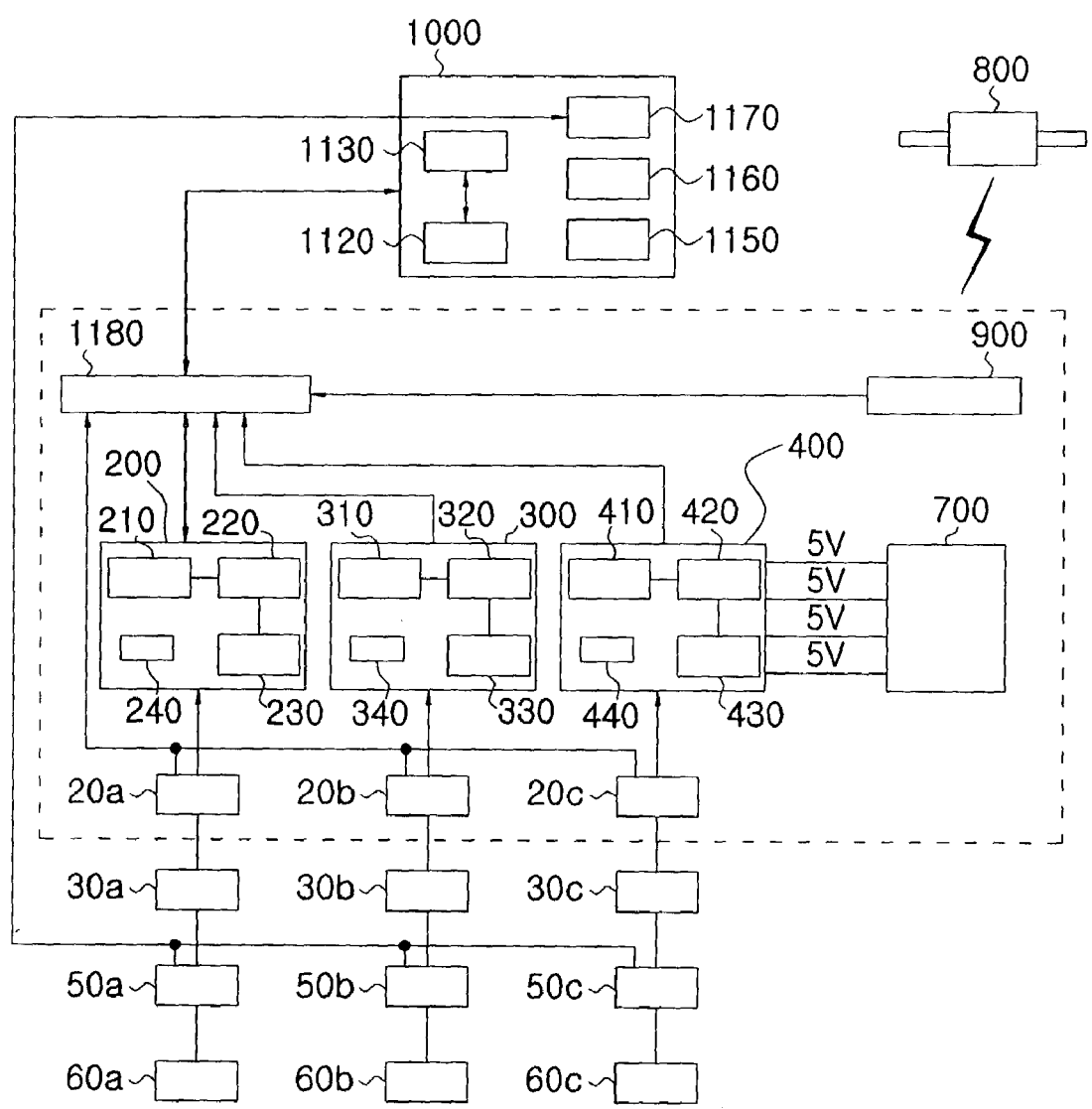
FIG. 5 illustrates a block diagram of a wireless data communication protocol measuring system according to an embodiment of the present invention.

FIG. 5 illustrates a block diagram of a wireless data communication protocol measuring system according to an embodiment of the present invention.

Referring to FIG. 5, a wireless data communication protocol measuring system according to an embodiment of the present invention mainly includes a plurality of mobile communication networks 30*a*, 30*b*, and 30*c*, a plurality of data communication networks 60*a*, 60*b*, and 60*c*, a plurality of data communication network matching equipments 50*a*, 50*b*, and 50*c* matching a plurality of the data communication networks 60*a*, 60*b*, and 60*c* with a plurality of the mobile communication networks 30*a*, 30*b*, and 30*c*, a plurality of mobile communication terminals 20*a*, 20*b*, and 20*c* corresponding to connect to a plurality of the mobile communication networks 30*a*, 30*b*, and 30*c*, a plurality of data calling module units 200, 300, and 400 connected to a plurality of the mobile communication terminals 20*a*, 20*b*, and 20*c*, a power supply unit 700 supplying a plurality of the data calling module units 200, 300, and 400 with power individually, a multiplexer 1180 having a plurality of the data calling module units 200, 300, and 400 connected thereto multiply, a host computer 1000 connected to the multiplexer 1180, and a GPS satellite 800 and a GPS receiver 900 providing the host computer 1000 with time information.

A plurality of the data calling module units 200, 300, and 400 include a first data calling module unit 200, a second data calling module unit 300, and a third data calling module unit 400.

The data calling module units 200, 300, and 400 include data communication protocol simulators 210, 310, and 410, data communication protocol packet acquisition control units 220, 320, and 420, data communication protocol packet acquiring units 230, 330, and 430, and clocks 240, 340, and 440, respectively.

The data communication protocol packet acquisition control units 220, 320, and 420 control the mobile communication terminals 20*a*, 20*b*, and 20*c* so that the data communication protocol packet acquiring units 230, 330, and 430 acquire data communication protocol packets (AT command, LCP, PAP, CHAP, IPCP, IP, TCP, UDP, ICMP, HTTP, HDTP, etc.) of a mobile communication network side from communication ports of the mobile communication terminals 20*a*, 20*b*, and 20*c*, and controls the data communication protocol simulators 210, 310, and 410, respectively.

The data communication protocol packet acquiring units 230, 330, and 430 acquire the data communication protocol packets (AT command, LCP, PAP, CHAP, IPCP, IP, TCP, UDP, ICMP, HTTP, HDTP, etc.), which are transmitted from the communication ports of the mobile communication terminals 20*a*, 20*b*, and 20*c*, of a mobile communication network by controls of the data communication protocol packet acquisition control units 220, 320, and 420, respectively.

The clocks 230, 340, and 440 are synchronized by the time information of the host computer 1000 provided with GPS time information.

The host computer 1000 includes a data communication network side data communication protocol measuring unit 1170, a mobile communication network side data communication protocol analyzing unit 1160, a mobile communication protocol measuring unit 1150, a time information synchronizing unit 1130, and a host computer clock 1120.

The mobile communication network side data communication protocol analyzing unit 1160 receives the data communication protocol packets (AT command, LCP, PAP, CHAP, IPCP, IP, TCP, UDP, ICMP, HTTP, HDTP, etc.), which are acquired from the first to third data calling module units 200, 300, and 400, of the side of the first to third mobile communication networks 30a, 30b, and 30c through the multiplexer 1180 to which the first to third data calling module units 200, 300, and 400 are multiply connected, and compares to analyze a performance, error, and the like of the side of the first to third mobile communication networks 30a, 30b, and 30c.

The data communication network side data communication protocol measuring unit 1170 acquires the data communication protocol packets (AT command, LCP, PAP, CHAP, IPCP, IP, TCP, UDP, ICMP, HTTP, HDTP, etc.) of a side of the first to third data communication networks 60a, 60b, and 60c by a certain communication method such as Ethernet or the like from the first to third data communication network matching equipments 50a, 50b, and 50c respectively to compare to analyze a performance, error, and the like of the side of the first to third data communication networks 60a, 60b, and 60c.

The mobile communication protocol measuring unit 1150 acquires mobile communication protocol measurement data transmitted from DM (diagnostic monitoring) ports of the first to third mobile communication terminals 20a, 20b, and 20c through the multiplexer 1180, thereby compare to analyze a performance, error, and the like of the mobile communication protocol of the first to third mobile communication networks 30a, 30b, and 30c. Moreover, the mobile communication protocol measuring unit 1150 enables to generate a voice call automatically as well as controls a multiple voice call.

The host computer clock 1120 is provided with valid time information of the GPS satellite 800 from the GPS receiver 900 through the multiplexer 1180 to be compensated with the time information periodically.

The time information synchronization unit 1130 acquires the time information of the host computer clock 1120 to synchronize the time information of the first to third clocks 240, 340, and 440 installed in the first to third data calling module units 200, 300, and 400 respectively, whereby the mobile communication network side data communication protocol packets, the data communication network side data communication protocol packets, and the mobile communication protocol measurement data are acquired by the synchronized time information to enable the analysis thereof.

In this case, for example of another embodiment of providing time information, one of the first to third data calling module units 200, 300, and 400 is provided with the valid time information of the GPS satellite 800 from the GPS receiver 900 to transfer the valid time information to the host computer 1000 through the multiplexer 1180, and then the valid time information transferred to the host computer 1000 is provided to a plurality of the data calling module units except the one having received the valid time information of the GPS satellite 800.

For example of a further embodiment of providing time information, communication ports are formed between the first to third data calling module units 200, 300, and 400 and one of the first to third data calling module units 200, 300, and 400 is provided with the valid time information of the GPS satellite 800 from the GPS receiver 900 to transfer the valid time information to the rest data calling module units.

For example of another further embodiment of providing time information, a plurality of the GPS receivers 900 are connected to the first to third data calling module units 200, 300, and 400 to provide the first to third data calling module units 200, 300, and 400 with the valid time information of the GPS satellite 800 simultaneously.

For example of another further embodiment of providing time information, when the valid time information of the GPS satellite 800 fails to be received, the first to third data calling module units 200, 300, and 400 are provided with the time information from the respective clocks of the first to third mobile communication terminals 20a, 20b, and 20c connected to the first to third data calling module units 200, 300, and 400, respectively.

As explained in the foregoing description, the reception of the time information through the GPS satellite 800 requires position information as well as the time information in measuring the wireless data communication protocol of the present invention.

Figure 6:
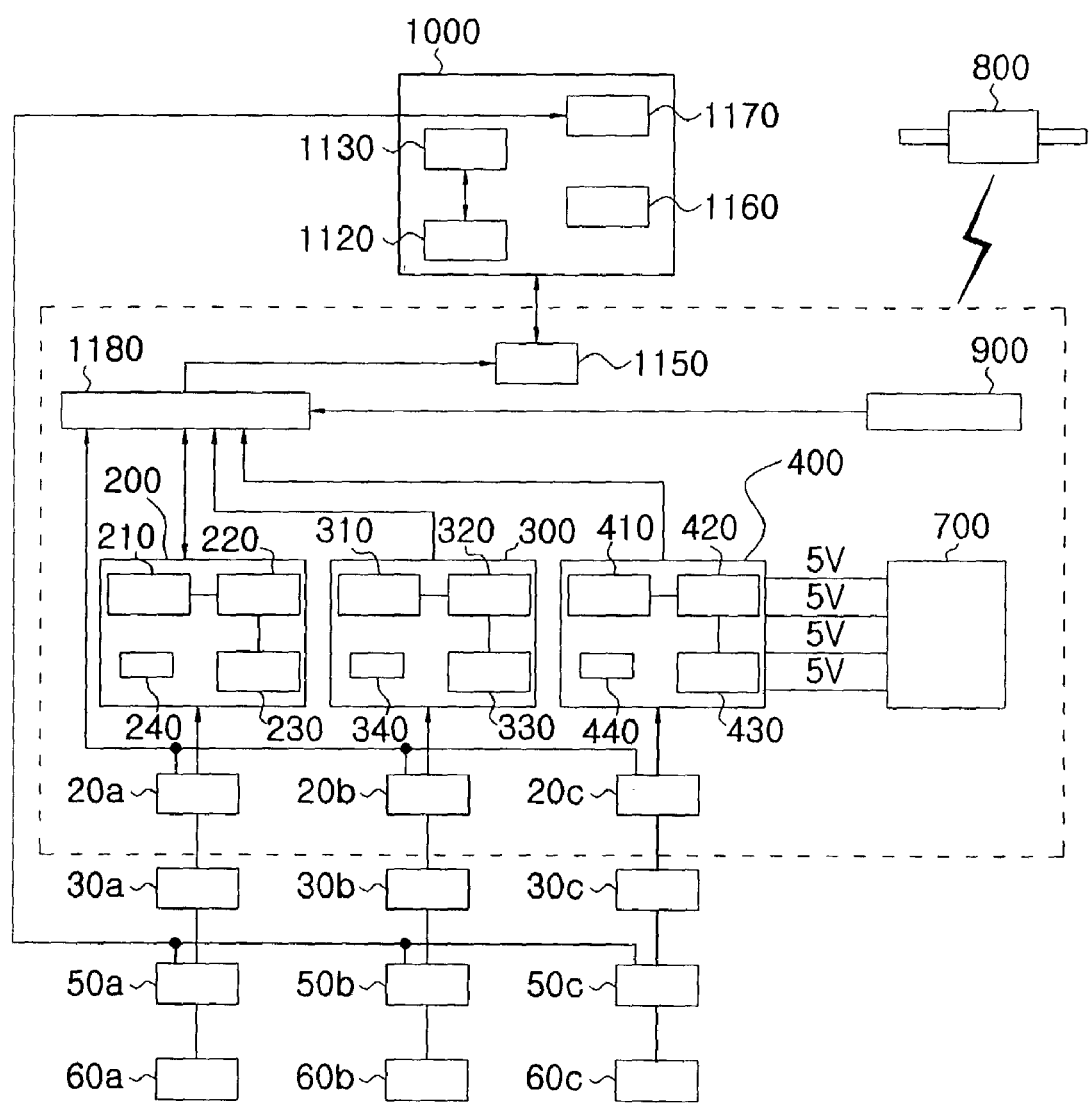
FIG. 6 illustrates a block diagram of a wireless data communication protocol measuring system according to another embodiment of the present invention.

FIG. 6 illustrates a block diagram of a wireless data communication protocol measuring system according to another embodiment of the present invention.

Referring to FIG. 6, unlike the previous embodiment of the present invention, a mobile communication protocol measuring unit 1150 measuring an RF signal to carry out a DM (diagnostic monitoring) control function is installed in hardware equipments having the first to third data calling module units 200, 300, and 400 installed therein instead of the host computer 1000.

Hence, the valid time information of the GPS satellite 800 is provided to the mobile communication measuring unit 1150 through the GPS receiver 900 and the multiplexer 1180, whereby the mobile communication protocol measuring unit 1150 provides the first to third data calling module units 200, 300, and 400 with the valid time information. The host computer then carries out the monitoring function.

When a wireless data communication protocol is measured, a system like that of the present invention is mounted on a vehicle to move around the corresponding area for the measurement. If the mobile communication protocol measuring unit 1150, as shown in FIG. 6, is installed in the hardware equipments having the first to third data calling module units 200, 300, and 400 installed therein instead of the host computer 1000 to build inside one case, it is unnecessary for the host computer 100 to take charge of the control function of the wireless data communication protocol diagnosis system entirely. Hence, it is able to construct the host computer 1000 with a simple PDA or a dummy computer as well as a personal computer (PC) to fit the vehicle environment more.

Therefore, a wireless data communication protocol diagnosis system according to the present invention enables to compare/analyze simultaneously a trouble caused by the measurement of a wireless data communication protocol by means of synchronizing individual data communication packets with mobile communication protocol measurement data by receiving the data communication packets transmitted individually from a plurality of terminals to connect to a measuring unit and by providing the individual data communication packets with precise time information from a time information providing means.

Moreover, the present invention analyzes an effect affecting a base station by measuring the effect that a plurality of the terminals affect the system of the present invention, i.e. a data communication rate according to the amount of the terminals connected to a base station, thereby enabling to improve a quality of the wireless data service.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A wireless data communication protocol diagnosis system including a plurality of mobile communication terminals connected by wire to a plurality of mobile communication networks and at least one data communication network matching equipment matching a data communication network to the corresponding mobile communication network, the wireless data communication protocol diagnosis system comprising:
    a plurality of data calling module units connected to a plurality of the mobile communication terminals to acquire data communication protocols of a mobile communication network side, respectively;
    a host computer comparing to analyze a performance of a mobile communication network side data communication protocol by receiving the data communication protocol packets from the data calling module units, the host computer comparing to analyze a performance of a data communication network side data communication protocol from the data communication network matching equipment;
    a mobile communication protocol measuring unit built inside one case together with a plurality of the mobile communication terminals and a plurality of the data calling module units to measure a mobile communication protocol from the corresponding mobile communication terminal; and
    a time information providing means for providing the data calling module units or the host computer with a time information,
    wherein the host computer provides a plurality of the data calling units with the time information if the time information providing means provides the host computer with the time information.

2. The wireless data communication protocol diagnosis system of claim 1, wherein the time information providing means is a GPS receiver.

3. The wireless data communication protocol diagnosis system of claim 1, wherein the time information providing means is the mobile communication terminal.

4. A wireless data communication protocol diagnosis system including a plurality of mobile communication terminals connected by wire to a plurality of mobile communication networks and at least one data communication network matching equipment matching a data communication network to the corresponding mobile communication network, the wireless data communication protocol diagnosis system comprising:
    a plurality of data calling module units connected to a plurality of the mobile communication terminals to acquire data communication protocols of a mobile communication network side, respectively;
    a host computer comparing to analyze a performance of a mobile communication network side data communication protocol by receiving the data communication protocol packets from the data calling module units, the host computer comparing to analyze a performance of a data communication network side data communication protocol from the data communication network matching equipment;
    a mobile communication protocol measuring unit built inside one case together with a plurality of the mobile communication terminals and a plurality of the data calling module units to measure a mobile communication protocol from the corresponding mobile communication terminal; and
    a time information providing means for providing the data calling module units or the host computer with a time information,
    wherein, if the time information providing means provides a specific one of a plurality of the data calling module units with the time information, the specific data calling module unit transfers the time information to the host computer and a plurality of the data calling module units except the specific data calling module unit are provided with the time information by the host computer.

5. The wireless data communication protocol diagnosis system of claim 4, wherein the time information providing means is a GPS receiver.

6. The wireless data communication protocol diagnosis system of claim 4, wherein the time information providing means is the mobile communication terminal.

7. A wireless data communication protocol diagnosis system including a plurality of mobile communication terminals connected by wire to a plurality of mobile communication networks and at least one data communication network matching equipment matching a data communication network to the corresponding mobile communication network, the wireless data communication protocol diagnosis system comprising:
    a plurality of data calling module units connected to a plurality of the mobile communication terminals to acquire data communication protocols of a mobile communication network side, respectively;
    a host computer comparing to analyze a performance of a mobile communication network side data communication protocol by receiving the data communication protocol packets from the data calling module units, the host computer comparing to analyze a performance of a data communication network side data communication protocol from the data communication network matching epuipment;
    a mobile communication protocol measuring unit built inside one case together with a plurality of the mobile communication terminals and a plurality of the data calling module units to measure a mobile communication protocol from the corresponding mobile communication terminal; and
    a time information providing means for providing the data calling module units or the host computer with a time information,
    wherein, if the time information providing means provides a specific one of a plurality of the data calling module units with the time information, the specific data calling module unit provides the host computer or the rest of the data calling module units with the time information.

8. The wireless data communication protocol diagnosis system of claim 7, wherein the time information providing means is a GPS receiver.

9. The wireless data communication protocol diagnosis system of claim 7, wherein the time information providing means is the mobile communication terminal.

10. A wireless data communication protocol diagnosis system including a plurality of mobile communication terminals connected by wire to a plurality of mobile communication networks and at least one data communication network matching equipment matching a data communication network to the corresponding mobile communication network, the wireless data communication protocol diagnosis system comprising:
- a plurality of data calling module units connected to a plurality of the mobile communication terminals to acquire data communication protocols of a mobile communication network side, respectively;
- a host computer comparing to analyze a performance of a mobile communication network side data communication protocol by receiving the data communication protocol packets from the data calling module units, the host computer comparing to analyze a performance of a data communication network side data communication protocol from the data communication network matching equipment;
- a mobile communication protocol measuring unit built inside one case together with a plurality of the mobile communication terminals and a plurality of the data calling module units to measure a mobile communication protocol from the corresponding mobile communication terminal; and
- a time information providing means for providing the data calling module units or the host computer with a time information,
wherein the time information providing means provides the host computer or a plurality of the data calling modules simultaneously with the time information.

11. The wireless data communication protocol diagnosis system of claim 10, wherein the time information providing means is a GPS receiver.

12. The wireless data communication protocol diagnosis system of claim 10, wherein the time information providing means is the mobile communication terminal.

* * * * *